(12) United States Patent
Kirkorowicz

(10) Patent No.: US 11,977,354 B2
(45) Date of Patent: May 7, 2024

(54) HOLOGRAPHIC PROJECTION ASSEMBLY

(71) Applicant: Gregory Kirkorowicz, Irvine, CA (US)

(72) Inventor: Gregory Kirkorowicz, Irvine, CA (US)

( * ) Notice: Subject to any disclaimer, the term of this patent is extended or adjusted under 35 U.S.C. 154(b) by 249 days.

(21) Appl. No.: 17/574,990

(22) Filed: Jan. 13, 2022

(65) Prior Publication Data

US 2022/0244681 A1 Aug. 4, 2022

Related U.S. Application Data

(60) Provisional application No. 63/207,026, filed on Feb. 4, 2021.

(51) Int. Cl.
*G03H 1/22* (2006.01)
*H04N 9/31* (2006.01)

(52) U.S. Cl.
CPC ......... *G03H 1/2294* (2013.01); *H04N 9/3173* (2013.01)

(58) Field of Classification Search
None
See application file for complete search history.

(56) References Cited

U.S. PATENT DOCUMENTS

| | | | | |
|---|---|---|---|---|
| 9,202,171 B2 * | 12/2015 | Kuhn | ................. | G07F 17/3276 |
| D762,761 S | 8/2016 | Daniel | | |
| 9,424,678 B1 * | 8/2016 | Enakiev | ................. | G01B 11/24 |
| 9,607,612 B2 * | 3/2017 | Deleeuw | ................. | G06F 3/013 |
| 9,721,257 B2 * | 8/2017 | Navaratnam | ......... | G06Q 30/02 |
| 10,783,428 B2 * | 9/2020 | Dolignon | ................. | G06N 5/02 |
| 11,212,494 B2 * | 12/2021 | Yanez | ..................... | H04R 1/403 |
| 11,792,363 B2 * | 10/2023 | Lavie | ..................... | G03B 21/56 |
| | | | | 348/14.16 |
| 2006/0171675 A1 * | 8/2006 | Kolletzki | ........... | H04N 21/4312 |
| | | | | 386/230 |
| 2018/0220110 A1 * | 8/2018 | Urbach | ................. | B05B 7/0884 |
| 2020/0082734 A1 * | 3/2020 | Sharma | ................. | G06T 19/003 |
| 2021/0203893 A1 * | 7/2021 | Yanez | ..................... | H04R 1/028 |
| 2022/0026736 A1 * | 1/2022 | Miller | .................... | G02B 17/06 |

FOREIGN PATENT DOCUMENTS

| | | | | |
|---|---|---|---|---|
| CN | 108034903 A | * | 5/2018 | |
| CN | 109243449 A | * | 1/2019 | ............ G10L 15/22 |
| CN | 111082872 A | * | 4/2020 | ............ G01S 17/89 |
| CN | 114303104 A | * | 4/2022 | ............ G02B 30/40 |
| WO | WO2015145219 | | 10/2015 | |
| WO | WO-2020036948 A1 | * | 2/2020 | ............ G02B 30/56 |
| WO | WO-2020257795 A1 | * | 12/2020 | ........... H04N 13/393 |

* cited by examiner

*Primary Examiner* — Reza Aghevli

(57) ABSTRACT

A holographic projection assembly for projecting a holographic image includes a housing that is positionable on a horizontal support surface. The housing is elongated thereby facilitating the housing to extend along a vertical axis when the housing is positioned on the horizontal support surface. A hologram emitter is integrated into the housing and the hologram emitter projects a hologram outwardly from the housing when the hologram emitter is turned on. In this way a user can view the hologram. A speaker is integrated into the housing to emit audible sound outwardly from the housing.

5 Claims, 5 Drawing Sheets

HOLOGRAPHIC PROJECTION ASSEMBLY

CROSS-REFERENCE TO RELATED APPLICATIONS

I hereby claim the benefit under 35 U.S.C. Section 119(e) of U.S. Provisional application 63/207,026 filed on Feb. 4, 2021.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to projection devices and more particularly pertains to a new projection device for projecting a holographic image.

(2) Description of Related Art Including Information Disclosed Under 37 CFR 1.97 and 1.98

The prior art relates to projection devices including a 3D teleconferencing device which employs a holographic projector. The prior art discloses a variety of virtual assistant devices which each at least employs a holographic projector. The prior art discloses a method and system of virtually controlling a global defense system which includes eyeglasses which display holographic imagery.

BRIEF SUMMARY OF THE INVENTION

An embodiment of the disclosure meets the needs presented above by generally comprising a housing that is positionable on a horizontal support surface. The housing is elongated thereby facilitating the housing to extend along a vertical axis when the housing is positioned on the horizontal support surface. A hologram emitter is integrated into the housing and the hologram emitter projects a hologram outwardly from the housing when the hologram emitter is turned on. In this way a user can view the hologram. A speaker is integrated into the housing to emit audible sound outwardly from the housing.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
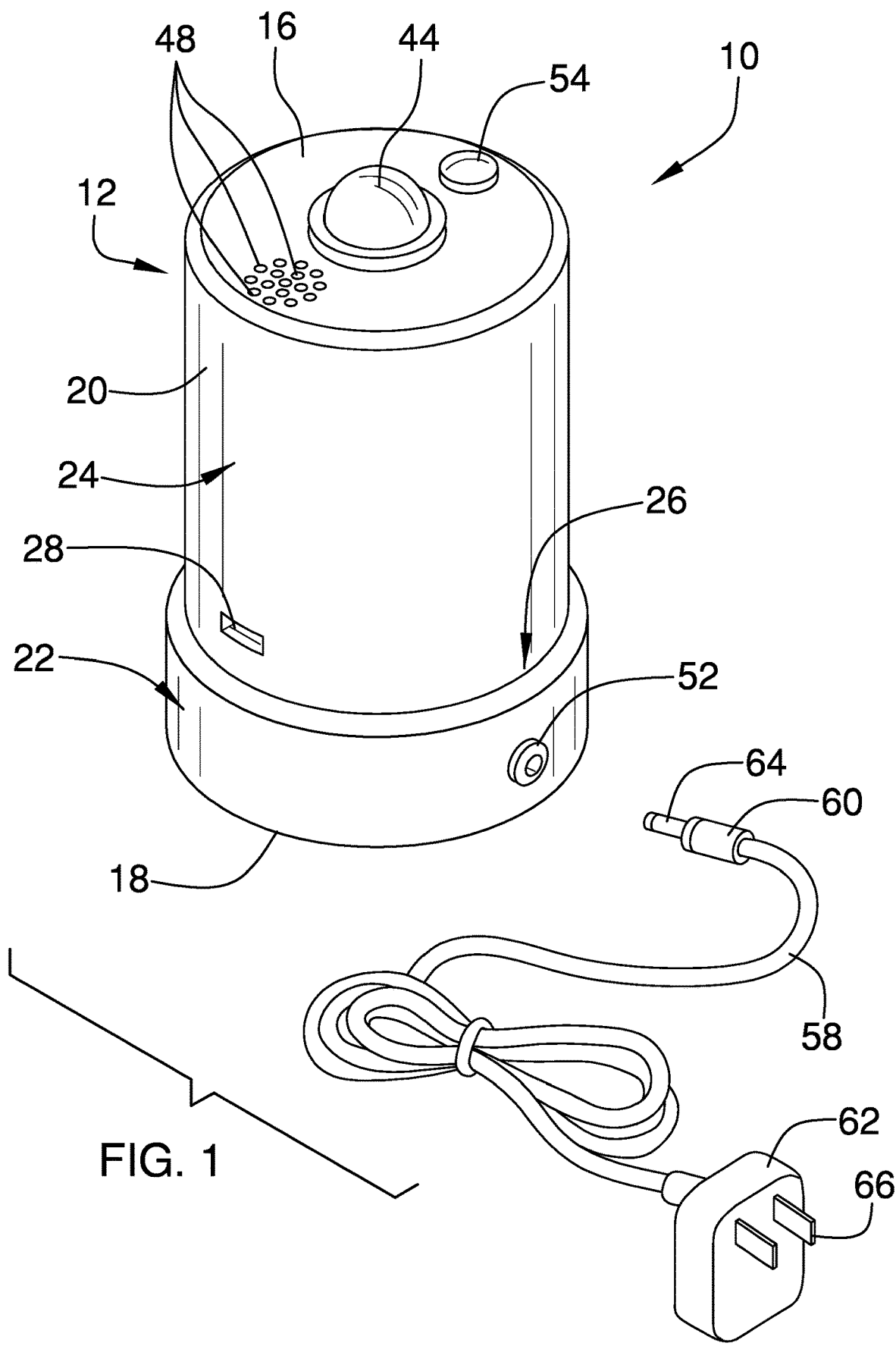
FIG. 1 is a top perspective view of a holographic projection assembly according to an embodiment of the disclosure.
Figure 2:
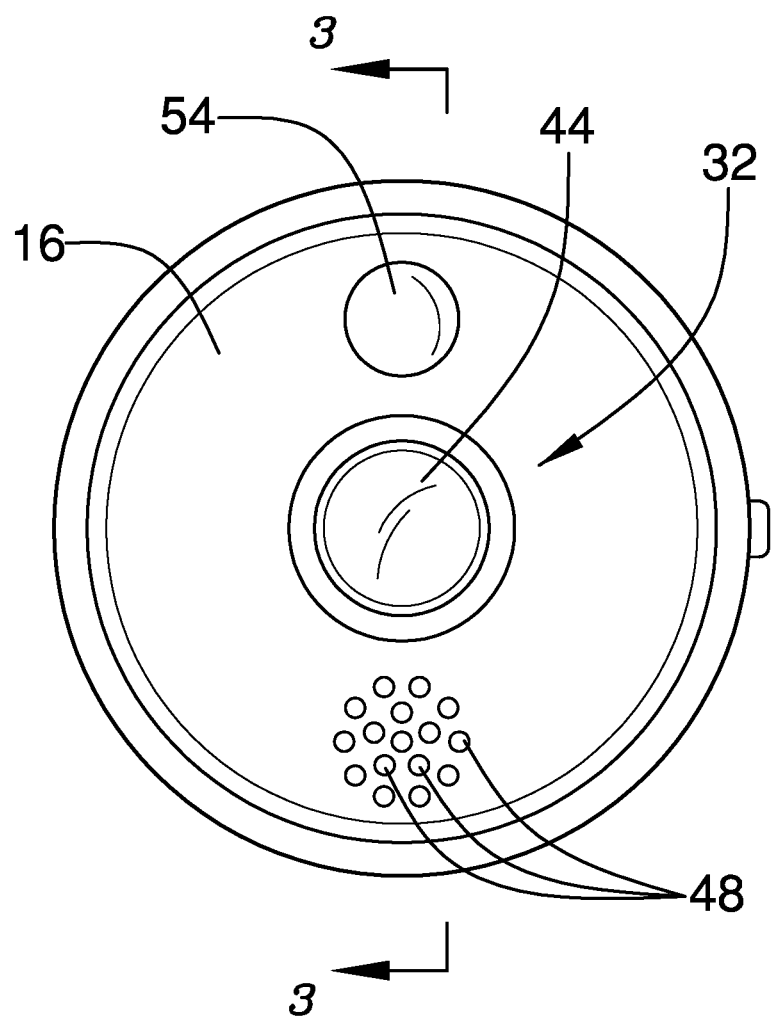
FIG. 2 is a top view of an embodiment of the disclosure.
Figure 3:
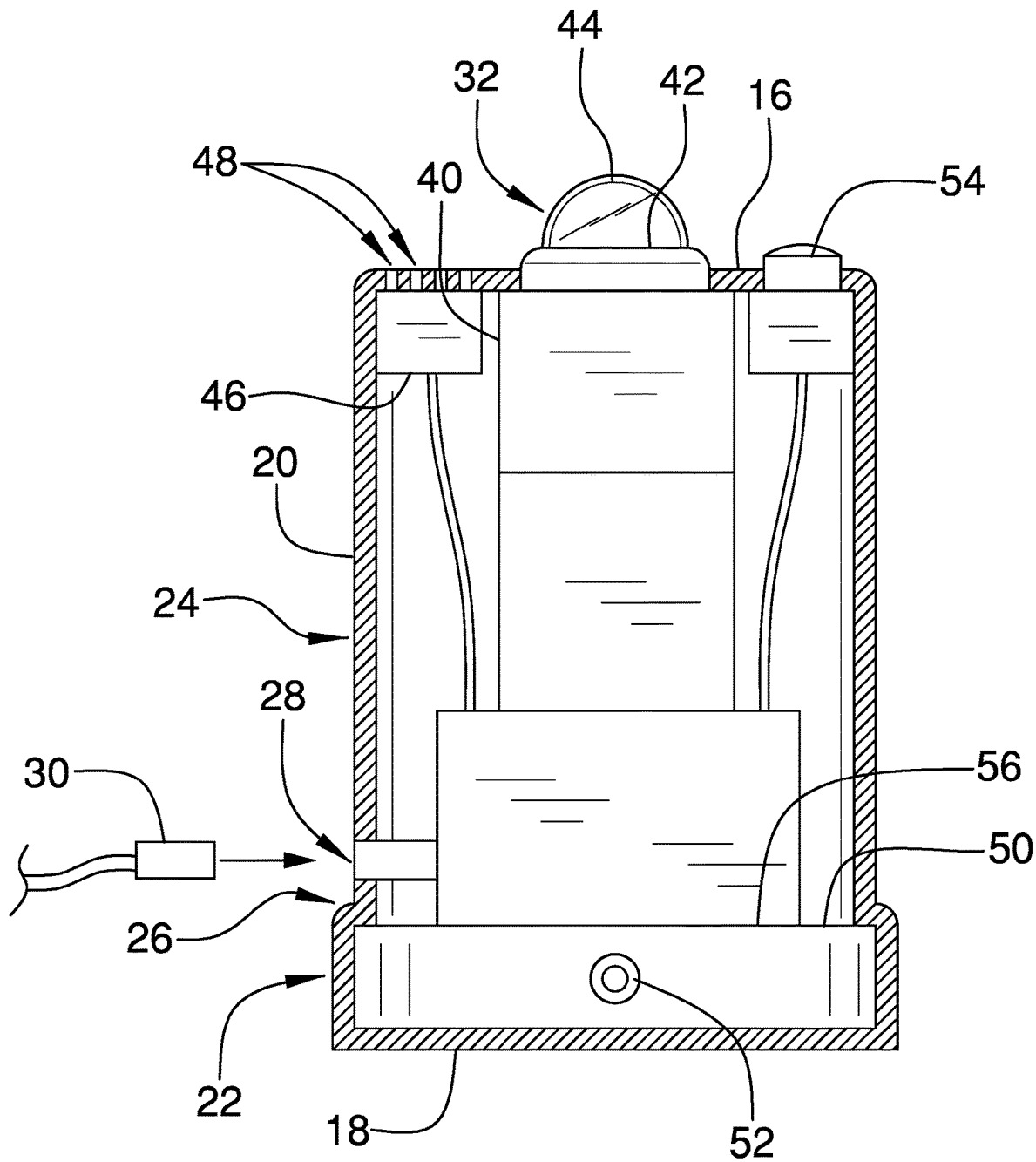
FIG. 3 is a cross sectional view taken along line 3-3 of FIG. 2 of an embodiment of the disclosure.
Figure 4:
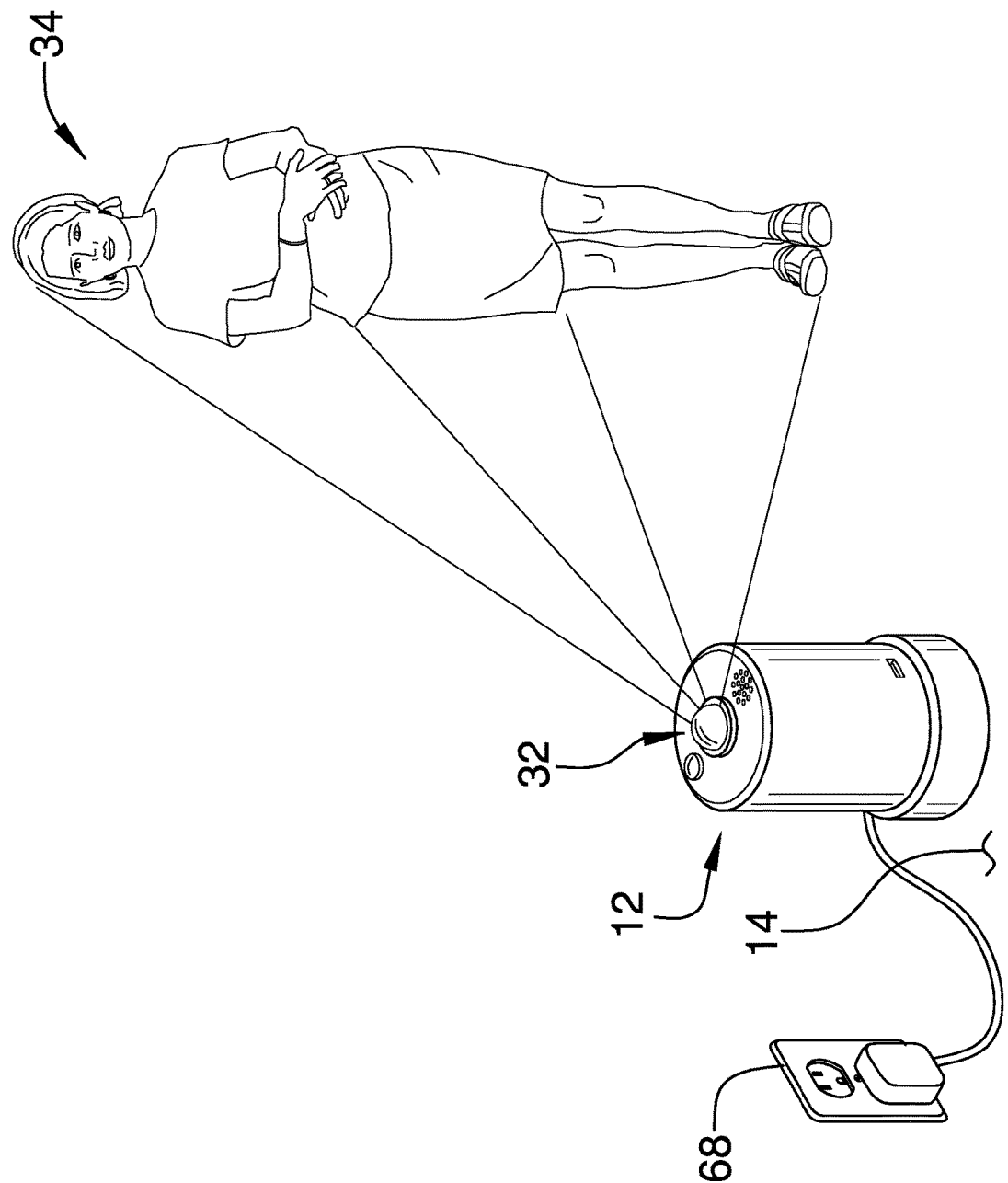
FIG. 4 is a perspective in-use view of an embodiment of the disclosure.
Figure 5:
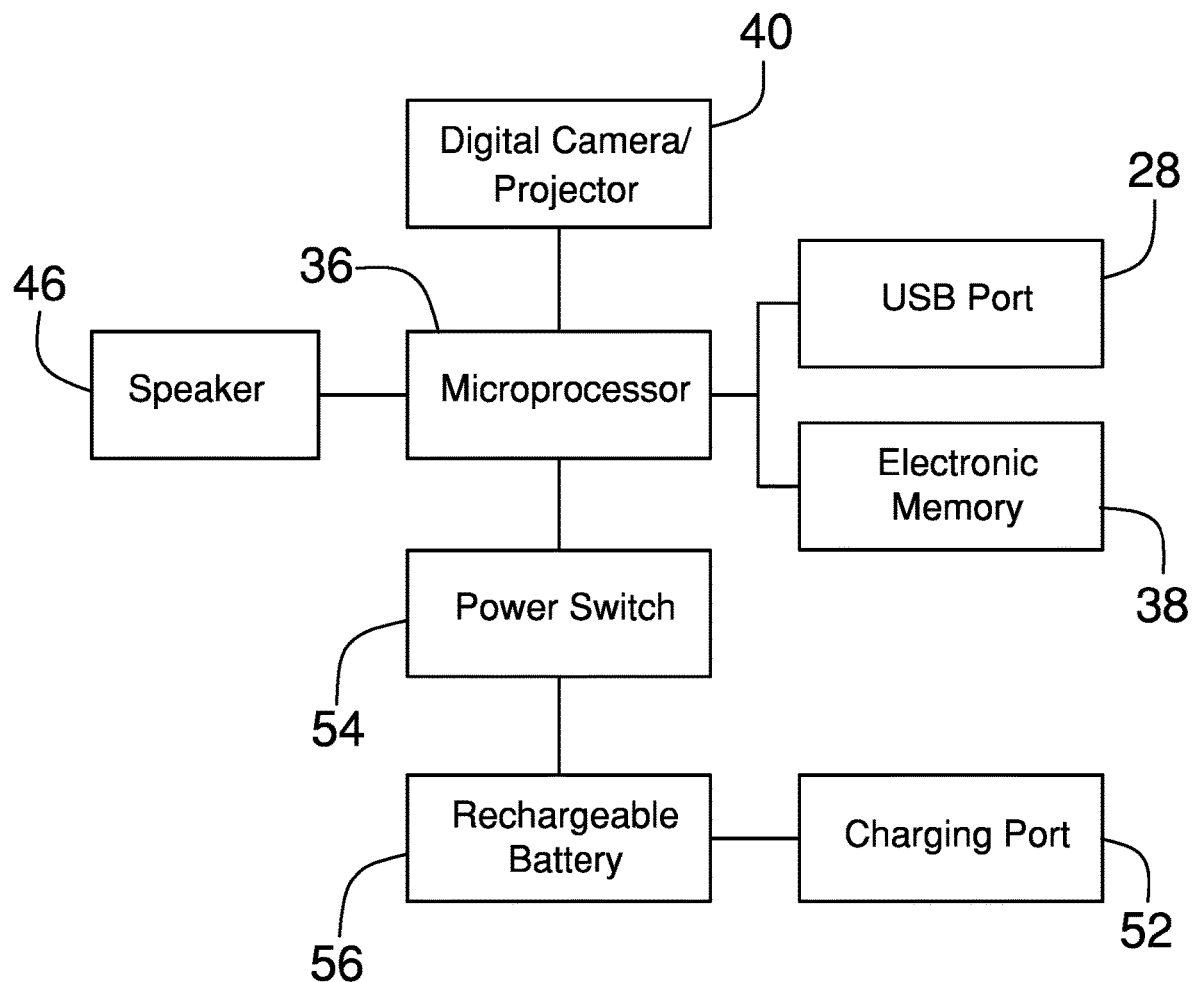
FIG. 5 is a schematic view of an embodiment of the disclosure.

With reference now to the drawings, and in particular to FIGS. 1 through 5 thereof, a new projection device embodying the principles and concepts of an embodiment of the disclosure and generally designated by the reference numeral 10 will be described.

As best illustrated in FIGS. 1 through 5, the holographic projection assembly 10 generally comprises a housing 12 that is positionable on a horizontal support surface 14. The housing 12 is elongated thereby facilitating the housing 12 to extend along a vertical axis when the housing 12 is positioned on the horizontal support surface 14. The horizontal support surface 14 may be a table top, the ground, a tombstone or any other horizontal support surface. The housing 12 has a top wall 16, a bottom wall 18 and an outer wall 20 extending between the top wall 16 and the bottom wall 18, and the outer wall 20 is continuously arcuate about an axis extending between the top wall 16 and the bottom wall 18 such that the housing 12 has a cylindrical shape.

The outer wall 20 has a lower portion 22 which has a diameter that is greater than the diameter of an upper portion 24. A threshold 26 between the upper portion 24 and the lower portion 22 is positioned closer to the bottom wall 18 than the top wall 16. The housing 12 has data port 28 which is recessed into the outer wall 20 of the upper portion 24 and the data port 28 insertably receives a data cord 30. The data port 28 may comprise a universal serial bus port or other similar type of data port and the data cord 30 may be a universal serial bus cord that is connected to a personal computer, for example, or other source of data.

A hologram emitter 32 is provided and the hologram emitter 32 is integrated into the housing 12. The hologram emitter 32 projects a hologram 34 outwardly from the housing 12 when the hologram emitter 32 is turned on. In this way the hologram emitter 32 facilitates a user to view the hologram 34. The hologram emitter 32 comprises a control circuit 36 that is integrated into the housing 12 and an electronic memory 38 that is integrated into the housing 12. The electronic memory 38 is electrically coupled to the control circuit 36 and the electronic memory 38 stores a database comprising digital imagery and digital audio. The electronic memory 38 is in electrical communication with the data port 28 to facilitate data to be downloaded into the electronic memory 38 pertaining to the digital imagery and the digital audio.

The hologram emitter 32 includes a projecting unit 40 is positioned within the housing 12 and the projecting unit 40 is positioned adjacent to the top wall 16. The projecting unit 40 is electrically coupled to the control circuit 36 and the projecting unit 40 receives the digital imagery from the electronic memory 38. In this way the projecting unit 40 can project a hologram 34 of a deceased individual, for example, based upon digital imagery of the deceased individual. The projecting unit 40 has an output 42 and the output 42 projects a holographic image derived from the digital imagery. The projecting unit 40 may comprise an electronic hologram projector of any conventional design.

The hologram emitter 32 includes a lens 44 which extends through the top wall 16, and the lens 44 is integrated into the projecting unit 40. The lens 44 is convexly arcuate with respect to the top wall 16 such that the lens 44 defines a dome for directing light across 180.0 degrees. The lens 44 is aligned with the output of the projecting unit 40 such that the lens 44 projects the hologram 34 outwardly from the top wall 16 of the housing 12. The lens 44 may comprise a fish eye lens or other type of lens that is commonly employed in holographic projection.

A speaker 46 is integrated into the housing 12 to emit audible sound outwardly from the housing 12. The top wall 16 of the housing 12 has a plurality of speaker holes 48 extending into an interior of the housing 12 and the speaker 46 is aligned with the speaker holes 48. The speaker 46 is electrically coupled to the control circuit 36 such that the speaker 46 receives the digital audio from the electronic memory 38. In this way the speaker 46 can emit words spoken by the deceased individual, for example, or other pre-recorded sounds that correlate to the digital imagery.

A power supply 50 is integrated into the housing 12 and the power supply 50 is electrically coupled to the control circuit 36. The power supply 50 comprises a power port 52 that is recessed into the lower portion 22 of the outer wall 20 of the housing 12. The power supply 50 includes a power button 54 that is movably integrated into the top wall 16 of the housing 12. The power button 54 is electrically coupled to the control circuit 36 for turning the control circuit 36 on and off.

The power supply 50 includes a rechargeable battery 56 that is integrated into the housing 12. The rechargeable battery 56 is electrically coupled to the control circuit 36 and the rechargeable battery 56 is electrically coupled to the power port 52 for charging the rechargeable battery 56. The power supply 50 includes a power cord 58 which has a first end 60 and a second end 62. The first end 60 comprises a power plug 64 that is insertable into the power port 52. The second end 62 comprises a male electrical plug 66 that can be plugged into a power source 68 comprising a female electrical outlet.

In use, the digital imagery and digital audio are downloaded into the electronic memory 38. The housing 12 is stood upright on the horizontal support surface 14 and the power button 54 is turned on. The hologram emitter 32 emits the holographic image and the speaker 46 emits the audible sounds. In this way a deceased individual, for example, can be seen and heard to comfort a relative or loved one of the deceased individual. Moreover, the digital imagery and digital audio may pertain to any person, place or thing that can be represented with a holographic image.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A holographic projection assembly for projecting a holographic image of a person along with audible words spoken by the person, said assembly comprising:
    a housing being positionable on a horizontal support surface, said housing being elongated thereby facilitating said housing to extend along a vertical axis when said housing is positioned on the horizontal support surface;
    a hologram emitter being integrated into said housing, said hologram emitter projecting a hologram outwardly from said housing when said hologram emitter is turned on wherein said hologram emitter is configured to facilitate a user to view the hologram, the hologram emitter comprising:
        a control circuit being integrated into said housing;
        a projecting unit being positioned within said housing, said projecting unit being positioned adjacent to said top wall, said projecting unit being electrically coupled to said control circuit; and
        a lens extending through a top wall of said housing, said lens being integrated into said projecting unit, said lens being convexly arcuate with respect to said top wall such that said lens defines a hemispherical dome wherein said lens is configured to direct light projected from the projecting unit across 180.0 degrees between a forward direction and a rearward direction away from the housing and across 180.0 degrees between a leftward direction and a rightward direction away from the housing; and
    a speaker being integrated into said housing wherein said speaker is configured to emit audible sound outwardly from said housing.

2. The assembly according to claim 1, wherein said housing has a top wall, a bottom wall and an outer wall extending between said top wall and said bottom wall, said outer wall being continuously arcuate about an axis extending between said top wall and said bottom wall such that said housing has a cylindrical shape, said outer wall having a lower portion having a diameter being greater than the diameter of an upper portion, a threshold between said upper portion and said lower portion being positioned closer to said bottom wall than said top wall, said outer wall of said upper portion having a data port being recessed into said outer wall of said upper portion wherein said data port is configured to insertably receive a data cord.

3. The assembly according to claim 1, wherein said hologram emitter comprises:
   an electronic memory being integrated into said housing, said electronic memory being electrically coupled to said control circuit, said electronic memory storing a database comprising digital imagery and digital audio, said electronic memory being in electrical communication with said data port to facilitate data to be downloaded into said electronic memory pertaining to said digital imagery and said digital audio;
   wherein said projecting unit receives said digital imagery from said electronic memory, said projecting unit having an output, said output projecting a holographic image derived from said digital imagery; and
   wherein said lens is aligned with said output of said projecting unit such that said lens projects the hologram outwardly from said top wall of said housing.

4. The assembly according to claim 2, further comprising:
   a control circuit being integrated into said housing; and
   a power supply being integrated into said housing, said power supply being electrically coupled to said control circuit, said power supply comprising:
      a power port being recessed into said lower portion of said outer wall of said housing;
      a power button being movably integrated into said top wall of said housing, said power button being electrically coupled to said control circuit for turning said control circuit on and off;
      a rechargeable battery being integrated into said housing, said rechargeable battery being electrically coupled to said control circuit, said rechargeable battery being electrically coupled to said power port, for charging said rechargeable battery; and
      a power cord having a first end and a second end, said first end comprising a power plug being insertable into said power port, said second end comprising a male electrical plug being configured to be plugged into a power source comprising a female electrical outlet.

5. A holographic projection assembly for projecting a holographic image of a person along with audible words spoken by the person, said assembly comprising:
   a housing being positionable on a horizontal support surface, said housing being elongated thereby facilitating said housing to extend along a vertical axis when said housing is positioned on the horizontal support surface, said housing having a top wall, a bottom wall and an outer wall extending between said top wall and said bottom wall, said outer wall being continuously arcuate about an axis extending between said top wall and said bottom wall such that said housing has a cylindrical shape, said outer wall having a lower portion having a diameter being greater than the diameter of an upper portion, a threshold between said upper portion and said lower portion being positioned closer to said bottom wall than said top wall, said outer wall of said upper portion having a data port being recessed into said outer wall of said upper portion wherein said data port is configured to insertably receive a data cord;
   a hologram emitter being integrated into said housing, said hologram emitter projecting a hologram outwardly from said housing when said hologram emitter is turned on wherein said hologram emitter is configured to facilitate a user to view the hologram, said hologram emitter comprising:
      a control circuit being integrated into said housing;
      an electronic memory being integrated into said housing, said electronic memory being electrically coupled to said control circuit, said electronic memory storing a database comprising digital imagery and digital audio, said electronic memory being in electrical communication with said data port to facilitate data to be downloaded into said electronic memory pertaining to said digital imagery and said digital audio;
      a projecting unit being positioned within said housing, said projecting unit being positioned adjacent to said top wall, said projecting unit being electrically coupled to said control circuit, said projecting unit receiving said digital imagery from said electronic memory, said projecting unit having an output, said output projecting a holographic image derived from said digital imagery; and
      a lens extending through said top wall, said lens being integrated into said projecting unit, said lens being convexly arcuate with respect to said top wall such that said lens defines a hemispherical dome wherein said lens is configured to direct light projected from the projecting unit across 180.0 degrees between a forward direction and a rearward direction away from the housing and across 180.0 degrees between a leftward direction and a rightward direction away from the housing, said lens being aligned with said output of said projecting unit such that said lens projects the hologram outwardly from said top wall of said housing;
   a speaker being integrated into said housing wherein said speaker is configured to emit audible sound outwardly from said housing, said speaker being electrically coupled to said control circuit such that said speaker receives said digital audio from said electronic memory; and
   a power supply being integrated into said housing, said power supply being electrically coupled to said control circuit, said power supply comprising:
      a power port being recessed into said lower portion of said outer wall of said housing;
      a power button being movably integrated into said top wall of said housing, said power button being electrically coupled to said control circuit for turning said control circuit on and off;
      a rechargeable battery being integrated into said housing, said rechargeable battery being electrically coupled to said control circuit, said rechargeable battery being electrically coupled to said power port for charging said rechargeable battery; and
      a power cord having a first end and a second end, said first end comprising a power plug being insertable into said power port, said second end comprising a male electrical plug being configured to be plugged into a power source comprising a female electrical outlet.

* * * * *